United States Patent [19]

Dona et al.

[11] Patent Number: 4,955,937
[45] Date of Patent: Sep. 11, 1990

[54] METHOD OF MANUFACTURING A MASTER INTENDED FOR THE MANUFACTURE OF PROJECTION SCREENS AND TOOL FOR CARRYING OUT THE METHOD

[75] Inventors: Marinus J. J. Dona; Johannes M. M. Swinkels, both of Eindhoven, Netherlands

[73] Assignee: U.S. Philips Corporation, New York, N.Y.

[21] Appl. No.: 371,680

[22] Filed: Jun. 22, 1989

Related U.S. Application Data

[63] Continuation of Ser. No. 134,667, Dec. 18, 1987, abandoned.

[30] Foreign Application Priority Data

Oct. 7, 1987 [NL] Netherlands ............... 8702384

[51] Int. Cl.⁵ ................. B23B 5/00; G03B 21/60
[52] U.S. Cl. ........................ 82/1.11; 82/11; 82/11.1
[58] Field of Search ............ 82/1.11, 13, 14 R, 18, 82/19, 12

[56] References Cited

U.S. PATENT DOCUMENTS

| | | | |
|---|---|---|---|
| 180,409 | 8/1876 | Alvord | 407/70 |
| 2,586,235 | 2/1952 | Krafft | 82/13 |
| 3,371,567 | 3/1968 | Davis | 407/69 |
| 3,994,562 | 11/1976 | Holzel | 82/14 R |
| 4,233,867 | 11/1980 | Zimmerman | 407/70 |
| 4,409,869 | 10/1983 | Huddle et al. | 407/69 |

Primary Examiner—J. J. Hartman
Assistant Examiner—Blynn Shideler
Attorney, Agent, or Firm—John C. Fox

[57] ABSTRACT

A method of manufacturing a master for projection screens, according to which a pattern of parallel rectilinear grooves (31) and ribs (31) is formed on one side of a plate of machinable material by a slotting operation performed by means of a profile chisel. The grooves (33) are formed in several different tooling steps with, several grooves being tooled simultaneously. The profile chisel is of multiple construction and is composed of three subchisels, i.e. a precutting chisel, a cutting chisel (13) and a finishing chisel.

1 Claim, 3 Drawing Sheets

METHOD OF MANUFACTURING A MASTER INTENDED FOR THE MANUFACTURE OF PROJECTION SCREENS AND TOOL FOR CARRYING OUT THE METHOD

This is a continuation of application Ser. No. 134,667, filed Dec. 18, 1987, now abandoned.

BACKGROUND OF THE INVENTION

The invention relates to a method of manufacturing a master for the fabrication of projection screens, the screens comprising a substrate of transparent material provided on one side with a lens structure consisting of a pattern of parallel rectilinear lens elements, which are separated by grooves. According to the method a pattern of parallel rectilinear grooves and ribs corresponding to the lens structure is formed on one side of a plate of machinable material by a tooling operation, the separate grooves being formed by a slotting operation performed by means of a profile chisel. The invention further relates to a tool for carrying out the method.

For the manufacture of projection screens, more particularly of rear projection screens, in general, first a so-called master or mother mould is manufactured; then a number of production moulds are manufactured from this master by means of known electrodeposition techniques, via one or more intermediate moulds. By means of the production moulds thus obtained, the projection screens can be manufactured with the aid of various forming processes, such as pressing, injection-moulding, etc. For this purpose, however, in general the known replica techniques are used.

It is known from U.S. Pat. No. 4,573,764 to provide the rib pattern during the manufacture of a master by means of a diamond chisel. By means of such a generally digitally controlled one-point chisel, the grooves and ribs are formed by so-called countouring, that is to say that each rib is profiled in a large number of small steps. This method of profiling is time-consuming. The procedure of contouring a master having for instance the dimensions of 0.8×1.0 m takes several days. During this period, the chisel must be replaced several times because of wear. The process can be controlled only with difficulty in view of the risk of temperature fluctuations, vibrations and the like, which may occur during this long operation and to which the work-piece, the tool and the precision arrangement on which the operation is carried out are subjected. The lens structure must be designed so that the pattern of grooves and ribs is accessible throughout its depth to the cutting point of the chisel, for example by providing dead spaces which in themselves are undesirable and which impose limits on the design of the lens structure.

These disadvantages are obviated in the method mentioned in the opening paragraph. In this method known from U.S. Pat. No. 3,765,281, a profile chisel is used for the manufacture of the master. The cutting profile of the chisel is formed in accordance with the desired cross-section of the grooves and ribs. By the use of a profile chisel, the grooves are not formed by contouring, but by means of a cutting operation called slotting and by the profile of the chisel. The time required for the manufacture of a master is reduced from several days to several hours. Since the manufacture can take place in a comparatively short time, the process can be more readily controlled.

However, this known method cannot be used universally and is not suitable for the manufacture of a master whose ribs have a thin wall portion and/or a sharp edge. During the step of cutting a groove the rib being formed, which is bounded on one side by the groove being cut and on the other side by the adjacent groove already cut, is loaded unilaterally. As a result, there is a risk of undesired deformation of the rib, more particularly of lateral bending of the rib towards the groove already cut. Deformation of the ribs results in an inability to achieve the accuracy requirements imposed and the process is not reproducible.

The invention has for its object to provide a method which does not suffer from these limitations and is suitable for the manufacture of masters with different patterns and profiles of grooves and ribs.

SUMMARY OF THE INVENTION

According to the invention, the method is for this purpose characterized in that the grooves are formed in several steps in a multi-step operation and in that in the various steps several grooves are simultaneously tooled each in a different tooling step.

By forming the separate grooves in several steps, the load of the work-piece by the chisel is spread over several grooves, as a result of which the reproducibility of the process is improved and the accuracy to size of the pattern of grooves and ribs is increased. The cutting rate in the different steps can be distributed and determined in such a manner that unilateral loading of the ribs being formed is minimal and that there is substantially no risk of undesired deformation of the ribs. When determining the cutting rate in the various steps, parts of the pattern that can be profiled only with difficulty can be taken into account in such a manner that on the parts requiring a high degree of accuracy to surface the cutting rate in the last step is a minimum.

A further improvement of the reproducibility and an increase of the accuracy to size of the work-piece are obtained in a preferred embodiment of the method according to the invention in that a composite multiple chisel is used, the superimposed profile of which is identical to the profile of the pattern of grooves and ribs to be provided on the plate. The multiple chisel can be tapered so as to be fully relievable. For the manufacture of master with a negative profile, a pattern of grooves and ribs which is negative with respect to the lens structure is provided on the plate, the superimposed profile of the multiple chisel used being identical to the profile of the lens elements. For the manufacture of a master with a positive profile, a pattern of grooves and ribs identical to the lens structure is provided on the plate by means of a chisel having a profile negative with respect to the lens elements.

According to another preferred embodiment of the method in accordance with the invention, the multi-step operation takes place in a precutting step, a cutting step and a finishing step. Experiments have shown that by such a subdivision of the whole operation, patterns of grooves and ribs that can be cut only with great difficulty by prior techniques can be provided on a plate in a reproducible and accurate manner within a comparatively short time.

In a further preferred embodiment of the method according to the invention, the cutting step and the finishing step are carried out simultaneously on two adjacent grooves. Thus, the rib located between the two adjacent grooves is tooled simultaneously on both flanks and is therefore loaded substantially uniformly so that undesired deformation of the rib due to unilateral loading is avoided. This measure is especially of importance when cutting sharp and deep structures for producing counterforces substantially balancing each other.

A still further preferred embodiment of the method according to the invention is characterized in that the plate is stretched on a rotatable drum; the chisel is mounted on a chisel holder; a first slotting operation is carried out by a feed-in movement of the chisel holder with the chisel in the radial direction with respect to the centre line of the drum and by a rotary movement of the drum; and further successive slotting operations are carried out due to successive stepwise relative displacements of the drum and the chisel holder in the axial direction over a distance equal to the pitch distance of the grooves to be cut. When the plate is stretched on a drum, a rigidly supported cylindrical body is obtained, which can be machined with a high degree of accuracy. It is clear that due to the use of a multiple profile chisel several grooves are machined simultaneously.

It should be noted that U.S. Pat. No. 3,994,562 discloses a method of manufacturing a master for projection screens, in which grooves are cut in a drum of wax by means of a chisel. Substrates of wax can be machined and manipulated only with difficulty and are very sensitive to temperature so that the required accuracy and reproducibility are not attained when using work-piece of wax.

Preferably, the plate, before being stretched, is first cut to flatness. The step of cutting to flatness can take place on the same drum as the cutting of the grooves and by means of a one-point chisel. When the plate is previously cut to flatness, this has a positive influence on the accuracy to size of the machined plate.

A master manufactured by the method according to the invention is characterized by a high degree of accuracy as to shape, size and surface of the grooves and ribs formed. The plate of the master can consist of any machinable material suitable for the manufacture of production moulds via the known electrodeposition techniques. The plate material used will often be synthetic material, preferably methyl acrylate, with which satisfactory results have been obtained.

The invention further relates to a chisel for carrying out the method. According to the invention, the chisel is of multiple construction and is composed of three subchisels, i.e. a precutting chisel, a cutting chisel and a finishing chisel. Experiments have shown that difficult profiles having a high degree of accuracy as to size and shape can be obtained with a multiple chisel composed of three subchisels.

A preferred embodiment of the chisel according to the invention is characterized in that the distance between the median planes of the cutting chisel and the precutting chisel is a multiple of the distance between the median planes of the cutting chisel and the finishing chisel. The distance between the median planes of the cutting chisel and the finishing chisel is equal to the pitch (distance between the grooves to be cut) so that during the operation the two flanks of a rib being formed are tooled simultaneously, the rib being supported at the two flanks by the cutting chisel and the finishing chisel and being loaded substantially uniformly so that undesired deformations of the rib in the transverse direction are avoided. Due to the fact that the distance between the median planes of the cutting chisel and the precutting chisel is comparatively large, i.e. equal to a multiple of the pitch distance, the rigidity of the multiple chisel is influenced positively.

Preferably, the subchisels are made of carbide metal. Experiments have shown that chisels of carbide metal have a long lifetime, especially when used for machining methyl acrylate. A master having the dimensions of 1382×1100 mm could be entirely manufactured with one of these chisels.

BRIEF DESCRIPTION OF THE DRAWINGS

The invention will be described more fully with reference to the drawing. In the drawing.

DESCRIPTION OF THE PREFERRED EMBODIMENTS

For the manufacture of a master for projection screens, more particularly rear projection screens, the starting material is a plate of machinable material, for example of synthetic material and preferably of methyl acrylate and of the desired dimensions. This plate is stretched on a rotatable drum and is then provided at its free surface with a pattern of rectilinear parallel grooves and ribs by a slotting operation with the aid of a multiple profile chisel. Preferably, the surface to be machined is first cut to flatness, for example by means of a one-point chisel of diamond.

Figure 1:
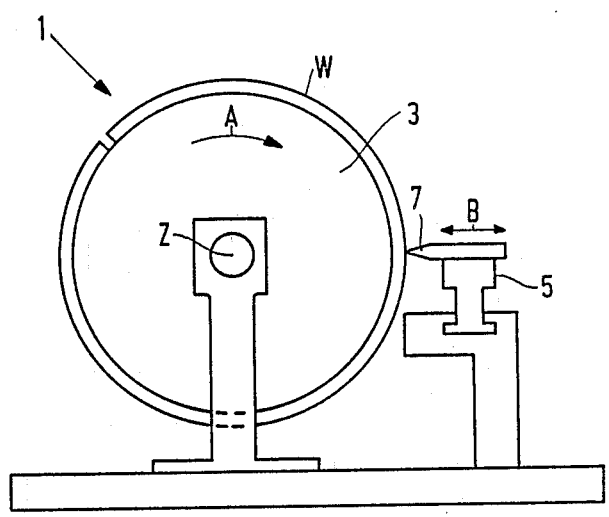
FIG. 1 shows diagrammatically an arrangement for carrying out the method according to the invention.

This situation is shown in FIG. 1, which shows diagrammatically an arrangement 1 comprising a drum 3 rotatable in the direction of the arrow A and a chisel holder 5 with a one-point chisel 7. W designates a workpiece, i.e. the plate stretched on the drum. The chisel holder 5 and the drum 3 are displaceable with respect to each other in a direction parallel to the centre line Z of the drum. Further, the chisel holder 5 is displaceable according to the arrow B in a radial direction with respect to the centre line Z of the drum. After the plate W has been cut to flatness, the one-point chisel 7 is replaced by the multiple profile chisel 9 shown in greater detail in FIG. 3.

Figure 3:
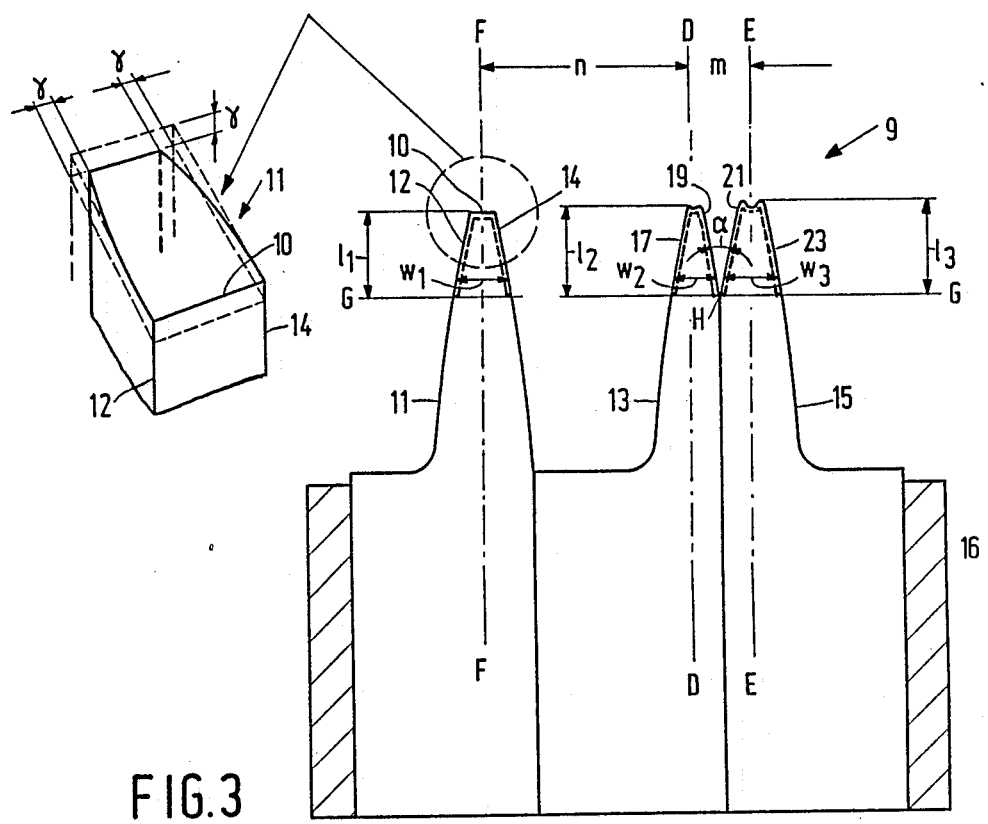
FIG. 3 is a longitudinal sectional view of the chisel according to the invention.
Figure 4:
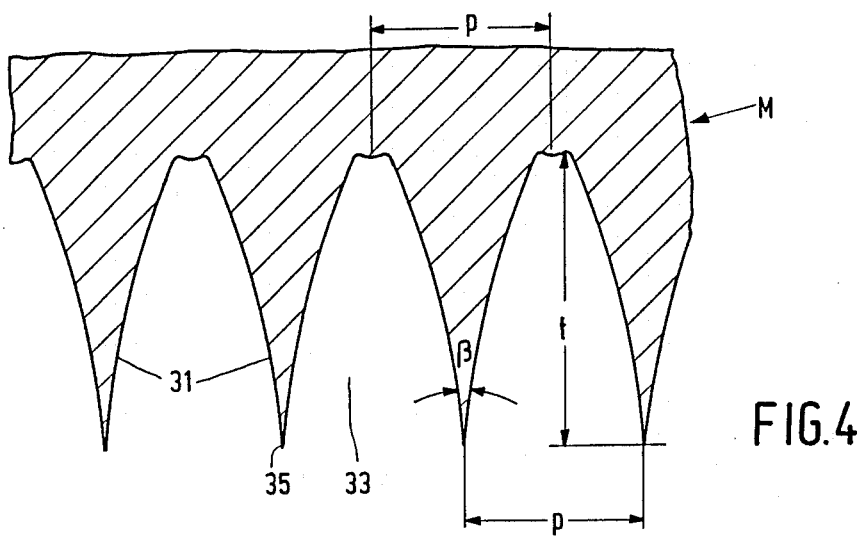
FIG. 4 shows in sectional view and on an enlarged scale a part of the master manufactured by the method according to the invention.

This profile chisel 9 is of multi-partite construction and is composed of three subchisels, i.e. a precutting chisel 11, a cutting chisel 13 and a finishing chisel 15. The three subchisels are held together in a fitting 16. The distance m between the median planes D—D and E—E of the cutting chisel 13 and the finishing chisel 15 is equal to the pitch (distance p of the grooves to be cut) (FIG. 4). The distance n between the median planes D—D and F—F of the cutting chisel 13 and the pre-cutting chisel 11 is a multiple of the pitch p, in the embodiment shown equal to four times the pitch. As clearly appears from FIG. 3, the distances m and n relate to the active cutting portions of the subchisels. The active cutting portions of the subchisels extends from the point to the transverse plane G—G through the line of intersection H of the cutting edges 19 and 21 of the subchisels 13 and 15. The length $L_3$ of the active portion of the finishing chisel 15 is greater than the length $L_2$ of the cutting chisel 13, which in turn is larger than the length $L_1$ of the precutting chisel 11. The width $w_1$ of the precutting chisel 11 is larger throughout its length $L_1$ than the width $w_2$ of the cutting chisel 13. Also the width $w_3$ of the finishing chisel 15 is larger throughout its length $L_3$ than the width $w_1$ of the precutting chisel 11.

The three subchisels 11, 13 and 15 are tapered and are provided with a clearance angle $\gamma$ along their whole active surface not only at the front side edge, but also at the lateral side edges 12 and 14, 17 and 19 and 21 and 23, respectively. In the embodiment, this clearance angle is equal for all three subchisels. In FIG. 3, reference 10 further indicates the rectilinear front side edge of the cutting portion of the precutting chisel 11.

The profile chisel 9 is designed and profiled so that manufactured production moulds are derived from the master which are suitable for replicating projection screens having a lens structure according to U.S. Pat. No. 4,573,764. In the present embodiment, the composite superimposed profile of the multiple profile chisel 9 is identical to the profile of the lens elements as described more fully in the said U.S. Patent.

FIGS. 2a to 2h show in a number of successive steps in the manufacture of a master by a slotting operation with the aid of the profile chisel 9. The cutting action required for the slotting operation is obtained by rotation of the drum 3 with the plate W. The profile chisel 9 carries out the feed-in or slotting movement in the direction of the arrow B. Further, the drum 3 with the plate W and the chisel holder 5 with the profile chisel 9 are relatively displaced stepwise in a direction parallel to the centre line of the drum over a distance equal to the pitch distance of the grooves to be cut, in this embodiment, in the direction of the arrow C.

Figure 2A:
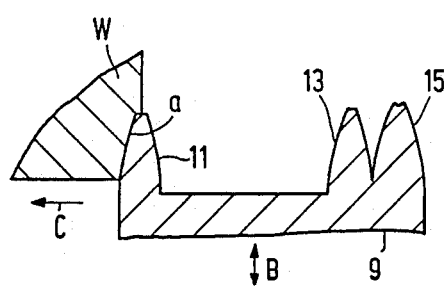
FIGS. 2a to 2h show the manufacture of a master by the method according to the invention in a number of successive steps.
Figure 2B:
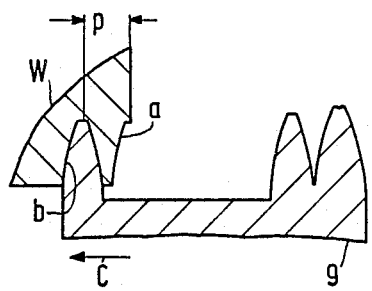
Figure 2C:
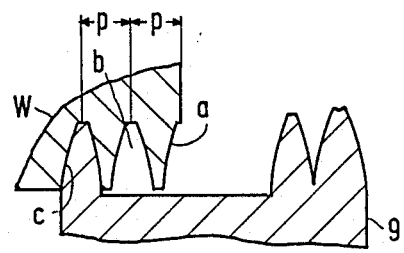
Figure 2D:
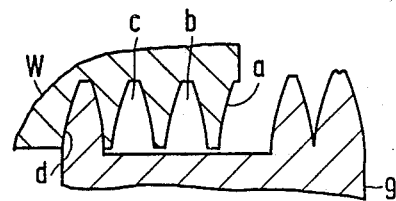
Figure 2E:
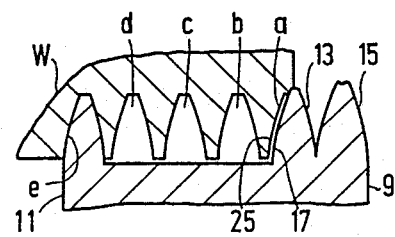

For the manufacture of a master by the method according to the invention, the grooves to be formed are first preformed in a precutting step by means of the precutting chisel 11. FIG. 2a shows the step of preforming a partial groove a. FIG. 2b shows the preformed groove a, while a next groove b is being preformed. In this situation, the profile chisel 9 has been displaced over the pitch distance p in the direction of the arrow C. FIG. 2c shows the preformed grooves a and b, while a third groove c is preformed at a distance p from the groove b by means of the precutting chisel 11. FIG. 2d shows the plate W with the three preformed grooves a, b and c, while after a further stepwise displacement of the profile chisel 9 over the pitch distance p, a fourth grooved is preformed by the precutting chisel 11. FIG. 2e shows the next tooling step, in which in a precutting step a fifth groove e is preformed, while the partial groove a is tooled in a cutting step by the cutting chisel 13; in this situation, merely the bottom of the preformed groove a is deepened by the front edge of the cutting chisel 13. The side edge 17 of the cutting chisel 13, which is narrower than the precutting chisel 11, remains free from the flank 25 of the groove a and is not active as a cutting edge.

Figure 2F:
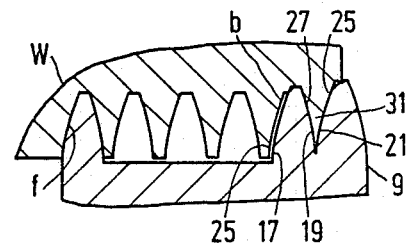
Figure 2G:
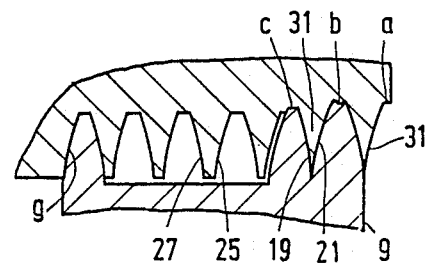
Figure 2H:
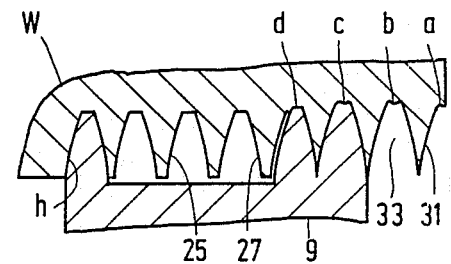

In the situation shown in FIG. 2f, a further groove groove f is preformed, while the groove b is machined by the cutting chisel 13. The bottom of the groove b is deepened by the cutting chisel 13 and the flank 27 of the groove b is preshaped by the side edge 19 of the cutting chisel 13. Also in this situation, the side edge 17 of the cutting chisel 13 remains free from the flank 25 of the groove b. A similar situation arises in the following steps. Since the finishing chisel 15 profiles at the same time the bottom and the flank 25 of the partial groove a in a finishing step, in this manner a rib 31 is formed terminating in a sharp knife edge and having the ultimately desired profile. Due to the fact that the rib 31 is machined simultaneously at both flanks 25 and 27, the rib 31 is loaded substantially uniformly in the transverse direction and undesired deformation of the rib in the transverse direction is avoided. FIG. 2g shows the preforming of a further groove g, while the righthand flank of the groove c is pre-profiled by the side edge 19 of the cutting chisel 13 and the bottom is recessed. The groove b is shaped by the finishing chisel 15 into the ultimate form, while again a rib 31 having the ultimately desired profile is formed between the two grooves b and c. FIG. 2h shows the next machining step, in which again a groove h is preformed by the precutting chisel 11, while the groove d is pre-shaped by the cutting chisel 13 and the groove c is shaped by the finishing chisel 15 into the ultimate profile.

FIG. 4 shows on an enlarged scale and in sectional view a part of the master M obtained ultimately in the manner described and provided with a number of identical profiled comparatively deep grooves 33 separated by ribs 31, whose wall terminates in a sharp knife edge 35. $\beta$ designates the apic angle of the rib 31, which corresponds to the intersection angle $\alpha$ in FIG. 3. The pitch p is equal to the maximum width of the grooves 33.

By means of the method according to the invention, a master was manufactured, in which the following parameters, dimensions and materials were used:

| | |
|---|---|
| plate material | methyl acrylate |
| dimensions plate | 1382 = 1100 mm |
| thickness plate | 2 mm |
| material profile chisel | carbide metal |
| clearance angle chisels | 5° |
| $l_2$-$l_2$ | 35 $\mu$m |
| $l_3$-$l_2$ 35 $\mu m$ | |
| depth grooves t | 0.424 $\mu$m |
| pitch distance p | 0.289 $\mu$m |
| intersection angle $\alpha$ = apic angle $\beta$ | 16° |

The time required for the manufacture of the master was 8 hours at a speed of revolution of the drum of 1/sec.

According to the embodiment described, a master was manufactured by means of a chisel having a positive profile identical to the profile of the lens structure of the ultimate projection screen, the master consequently having a negative profile. In a similar manner, by means of the method according to the invention, masters can be manufactured having a positive profile identical to the lens structure, in which event a chisel having a negative profile is used.

Further, in the embodiment described, a pattern of identical grooves and ribs is provided on the plate. However, it is also possible to cause the profile of the grooves and ribs to vary from pitch to pitch by a stepwise rotation of the multiple chisel in the cutting plane.

What is claimed is:

1. A method of manufacturing a master for the fabrication of projection screens, such screens comprising a substrate of transparent material provided on one side with a lens structure consisting of a pattern of parallel rectilinear lens elements which are separated by grooves, the method comprising forming a pattern of parallel rectilinear grooves and ribs corresponding to the lens structure on one side of a plate of machinable material by a tooling operation, characterized in that the grooves are formed by:

(a) precutting in successive steps grooves separated by a pitch distance p by a first precutting operation using a first precutting chisel;

(b) carrying out a second precutting operation in successive steps on each of the precut grooves, the operation consisting of deepening the bottom while simultaneously profiling only one of the flanks of each precut groove using the front edge and one side edge of a second precutting chisel;

(c) carrying out a finishing operation in successive steps on each of the precut grooves, the operation consisting of simultaneously profiling the bottom and only the other flank of each of the precut grooves using the front edge and one side edge of a finishing chisel;

the successive steps of the second precutting operation and the finishing operation being carried out simultaneously on adjacent flanks of adjacent grooves during at least a portion of the manufacture, whereby the ribs formed by the adjacent flanks are loaded substantially uniformly in the transverse direction during these operations.

* * * * *